*W. B. Scott,*

*Anti Friction Roller.*

No. 98,804. Patented Jan. 11, 1870.

William Bonham Scott
by his Attorney
A. Pollok

WITNESSES.

United States Patent Office.

WILLIAM BONHAM SCOTT, OF NEW YORK, N. Y.

Letters Patent No. 98,804, dated January 11, 1870.

IMPROVED METHOD OF APPLYING ANTI-FRICTION ROLLERS TO WHEELS.

The Schedule referred to in these Letters Patent and making part of the same.

*To all whom it may concern:*

Be it known that I, WILLIAM BONHAM SCOTT, of the city, county, and State of New York, have invented certain new and useful Improvements in the Method of Applying Anti-Friction Rollers to Wheels and other parts of machinery; and I hereby declare the following to be a full, clear, and exact description of the same, reference being had to the accompanying drawings, in which—

Figure 1:
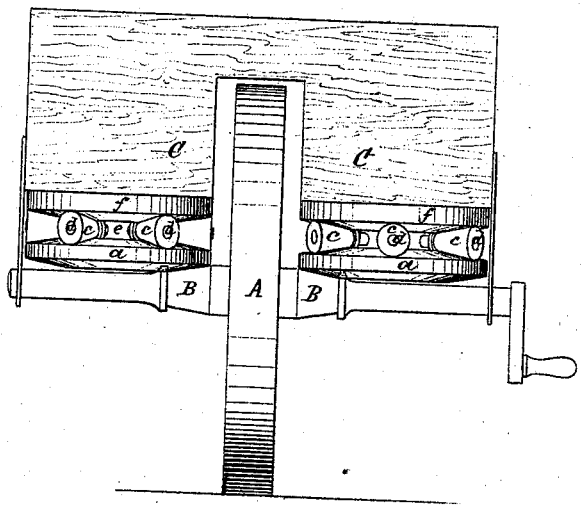
Figure 1 is an elevation of a wheel provided with anti-friction devices in accordance with my invention.

My invention is intended to do away with the friction which usually comes upon the journals of wheels, and to which those parts of machinery which rotate in or upon bearings are ordinarily subjected. To effect this object, I employ disks, upon which the journal, shaft, or other rotating part bears, the rotation of said part serving to communicate a corresponding rotating movement to the disks, so that there is no sliding-friction between them; and, in order to prevent friction upon the disks, I support them upon rollers of suitable size and conformation, which will revolve freely, and, in turn, bear against a suitable bearing-surface. Under this arrangement, the disks, in their rotation, communicate a corresponding rotary movement to the rollers, so that between these there is no sliding-friction; and, in like manner, as the rollers revolve upon their bearing-surfaces, they do not rub or draw over said surfaces, so that all sliding-friction is entirely avoided.

The form and proportion of these anti-friction devices may be varied considerably, without departure from the principle of my invention, to accord with the particular machinery or device with which they may be used.

In order that the nature of my invention may be more fully understood, I shall now, in illustration of the same, describe, by reference to the accompanying drawings, an arrangement applicable to wheeled vehicles.

In said drawings—

A represents a railroad-car or other wheel, the journals B of which bear against the disks $a$, mounted loosely, and so as to be capable of revolving upon the vertical axes $b$, fixed to the frame C of the truck or other part, to which the wheel is applied. The disks $a$ bear, in their turn, upon rollers $c$, which are mounted, and are capable of revolving upon spindles or axes $d$, radiating from hubs $e$, mounted loosely upon the same axes or shafts, $b$, which carry the disks $a$. The rollers $c$ bear against the annular surfaces $f$, which are immovable, and are attached to or form part of the frame C.

The journals B, which are in contact with the disks $a$ at the point shown in the drawing, are made conical or tapering in form, for reasons which will be readily seen. If, for instance, instead of being tapering, they were cylindrical, or of equal diameter at every point, in which case the surfaces of the disks with which they have contact would be flat, then there would be necessarily friction between the journals and disks at some point; for, while it is true that every part of the disk makes one revolution in the same time, yet it at its circumference is greater than at any other point intermediate between that point and the axis. The cylindrical journals B would have, however, an equal speed at every point upon its periphery which is in contact with the bearing-surface of the disk, so that, if the journal revolved in unison with the outer portion of the bearing-surface of the disk, or that portion furthest removed from the axis, it would not revolve in unison with the more slowly-moving portion of the bearing-surface intermediate between that outer point and the axis, and there would thus be necessarily a sliding-friction between the two. Instead, therefore, of making the journal of cylindrical shape, I make it tapering toward the axis $b$, so that its periphery shall be directly proportionate to its distance from said axis $b$. Thus the periphery of the journal will have the same relatively greater speed in proportion to its distance from the axis as the bearing-surface of the disk, so that the two will move in unison at all points of contact, and all friction will be avoided. The surface of the disk has, of course, a corresponding inclination with the taper of the journal, so that the two may be properly in contact. A greater or lesser portion of the face of the disk, as desired, may be used for the bearing-surface. A circular recess is, or may be formed in the face of each of the disks around the axis, in which is held a corresponding shoulder, $h$, on each end of the journal, the object of this being to hold the journal firmly in place, so as to prevent all lateral play. The ends of the shaft projecting beyond the journals are, or may be held in brackets $g$, which prevent the shaft or journals from getting out of place with relation to the disks.

Figure 2:
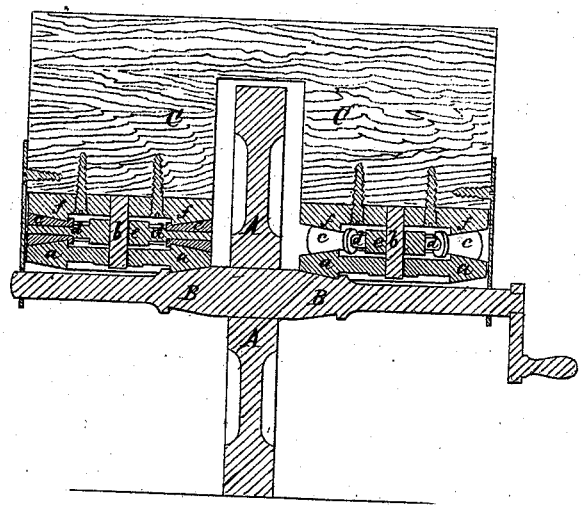
Figure 2 is a vertical section of the same.

As regards the rollers $c$, which are held between the upper faces of the disks $a$ and the stationary disks or bearing-surfaces $f$, they are made tapering or conical in form, like the journals B, and for the same reason; and they also, like the journals, are, or may be provided with shoulders, which are received in circular recesses formed in the parts $f$, and as shown clearly in fig. 2. The upper faces of the disks $a$ and the bearing-surfaces $f$ are also made inclined for the same reason, the lower bearing-surfaces or faces of the disks $a$ being inclined, as above stated.

When the journals B are in motion, they, by reason of their contact with the disks, cause a corresponding rotation of the latter upon their axes $b$. These disks, in turn, being in contact with the rollers $c$, communicate to them a rotary movement, and the rollers revolve not only upon their own axes $d$, but also around the axes $b$, upon which the hub which carries the radial axes $d$ is loosely mounted. There is no sliding-friction between the rollers and the disks $a$, for they move in unison—that is to say, their surfaces move at an equal rate of speed—and there is no friction between the rollers and the stationary bearing-surfaces $f$, for they roll or revolve upon such surfaces, just as an ordinary wheel or cylindrical body may be rolled over a suitable surface.

By the means above described, I avoid rubbing or attrition between the parts, and prevent the wear upon them which is inevitable in the use of ordinary journal and bearings.

As above stated, the construction and arrangement of the devices may be varied without departure from the principle of my invention; for instance, balls might be employed instead of the conical rollers. I much prefer, however, the arrangement shown and described, as it enables me to produce the best results by simple and comparatively inexpensive means.

The spindles or axes $d$ are not subjected, to any appreciable extent, to friction, as they do not support nor convey the rollers, but only serve to hold them in place at the proper distance apart.

It is needless to say that any suitable number of rolls may be used.

The invention, while applicable to all parts of machinery which rotate in or upon bearings, is particularly adapted for the axles or journals of railroad-car wheels, which are usually subjected to excessive friction and wear. By the use of my invention, this friction and wear and tear are avoided.

Having now described my invention, and the manner in which the same is or may be carried into effect,

What I claim, and desire to secure by Letters Patent, is—

1. The combination, with the journal of the car-wheel or other rotating device, of a disk or disks, interposed between said journal, and anti-friction rollers, or their equivalents, as described, the disk or disks being arranged so as to form a bearing-surface for and to rotate with said journal, and to transmit such rotary movement to the rollers, substantially as and for the purposes shown and set forth.

2. The combination of the tapering journals with the tapering or conical anti-friction rollers and the bearing-disks, interposed between the rollers and journals, and having their faces inclined, so as to fit and be in contact with the tapering journals and rollers, as shown and set forth.

3. The arrangement, in relation to the journal or axle, of the bearing-disk with which said journal is in contact, and the series of anti-friction rollers upon which said disk is supported, substantially as shown and described, so that both the disk and its anti-friction rollers shall revolve around the same axis, as set forth.

4. The arrangement, in combination with each bearing-disk with which the journal is in rolling contact, of the conical anti-friction rollers upon spindles or axes radiating from a hub mounted loosely on the spindle or axis upon which the bearing-disk of the journal rotates, substantially as shown and described.

5. The combination of the journals and their rotating disks with the anti-friction rollers, arranged to move around the axes of their respective disks, and the stationary bearing-surfaces upon which said rollers revolve, under the arrangement and for operation as set forth.

In testimony whereof, I have signed my name to this specification, before two subscribing witnesses.

W. B. SCOTT.

Witnesses:
A. POLLOK,
R. A. PIPER.